United States Patent [19]
Hund

[11] Patent Number: 5,984,019
[45] Date of Patent: Nov. 16, 1999

[54] HITCHING DEVICE FOR ATTACHMENT TO A TRACTOR

[76] Inventor: George A. Hund, Rte. 1, Box 26, Paxico, Kans. 66526

[21] Appl. No.: 09/138,762

[22] Filed: Aug. 24, 1998

Related U.S. Application Data

[63] Continuation-in-part of application No. 08/917,323, Aug. 25, 1997, abandoned, which is a continuation-in-part of application No. 08/623,468, Mar. 28, 1996, Pat. No. 5,730,227, which is a continuation-in-part of application No. 08/380,378, Jan. 30, 1995, abandoned.

[51] Int. Cl.$^6$ ..................................................... A01B 69/06
[52] U.S. Cl. ........................ 172/439; 172/272; 280/416.2
[58] Field of Search ..................... 37/901, 903; 172/272, 172/413, 417, 939, 445, 448, 662, 772–775, 776; 414/703, 920; 280/416.2

[56] References Cited

U.S. PATENT DOCUMENTS

| | | |
|---|---|---|
| 2,321,516 | 6/1943 | Robertson . |
| 2,531,768 | 11/1950 | Cline et al. . |
| 3,255,828 | 6/1966 | Abbott . |
| 3,338,594 | 8/1967 | Schuler . |
| 3,716,253 | 2/1973 | Gniffke et al. . |
| 3,830,314 | 8/1974 | Aitkenhead . |
| 4,502,706 | 3/1985 | Frambach, Sr. . |
| 5,029,650 | 7/1991 | Smit . |
| 5,169,279 | 12/1992 | Zimmerman . |
| 5,193,623 | 3/1993 | Burette . |
| 5,232,055 | 8/1993 | Van Vuuren . |

OTHER PUBLICATIONS

Pp. 22–28 of a John Deere Owner's Manual, published prior to Jan. 30, 1994.

*Primary Examiner*—Robert E. Pezzuto
*Attorney, Agent, or Firm*—Litman, Kraai & Brown L.L.C.

[57] ABSTRACT

A hitching device for attachment to a three-point hitch, or to a quick-attaching coupler on a three-point hitch, has a frame removably coupled to the draft links of the three-point hitch or hooks of a quick-attaching coupler. The frame has a horizontal member adapted to allow attachment of an implement. The horizontal member is disposed at a location that is below the draft links and that is forward of the ends of the draft links so that the horizontal member is closer to the tractor or other drive vehicle than the ends of the draft links. An alternative embodiment of hitching device includes an elevated hitch ball on top thereof for accommodating a fifth wheel trailer hitch. A pair of tine receiving slots are positioned in the two lowermost corners of the alternative hitching device frame for receiving a respective pair of rearwardly extending fork lift tines.

18 Claims, 8 Drawing Sheets

HITCHING DEVICE FOR ATTACHMENT TO A TRACTOR

CROSS REFERENCE TO RELATED APPLICATIONS

This application is a continuation-in-part of application Ser. No. 08/917,323, filed Aug. 25, 1997, now abandoned and entitled HITCHING DEVICE FOR ATTACHMENT TO A TRACTOR which is a continuation-in-part of application Ser. No. 08/623,468, filed Mar. 28, 1996, now U.S. Pat. No. 5,730,227, entitled HITCHING DEVICE FOR ATTACHMENT TO A TRACTOR which is a continuation-in-part of application Ser. No. 08/380,378, filed Jan. 30, 1995, now abandoned, and entitled. HITCHING DEVICE FOR ATTACHMENT TO A TRACTOR.

BACKGROUND OF THE INVENTION

This invention relates to a hitching device which is attachable to or in association with a three-point hitch such as a three-point hitch of a tractor and which is adjustable to allow for easy attachment of an implement.

A typical tractor has a drawbar extending rearwardly from the back of the tractor. The drawbar is normally fixed at a particular height. The distance the drawbar extends beyond the back of the tractor is adjustable by a pin arrangement located on the bottom of the tractor chassis. A hitching aperture is formed adjacent the rearward end of the drawbar.

In order to hitch an implement to a tractor, the tractor operator first adjusts the height of the implement so that the implement hitch approximates the height of the drawbar. The height of the hitch is typically adjusted by utilizing a hand-cranked jack. After the operator adjusts the hitch's height to the correct level, the operator then backs the tractor while aligning the rearward end of the drawbar with a clevis located on the forward end of the implement hitch. The hitching aperture is aligned with apertures formed in the implement clevis. A pin is positioned in the aligned apertures to effectuate a connection between the implement and the tractor.

As is apparent, the hitching operation with a fixed height drawbar requires the operator to climb down from the operating platform of the tractor in order to adjust the height of the implement hitch. After the implement hitch has been adjusted, the operator must then climb back up onto the platform and align the drawbar with the implement hitch. If the operator does not adjust the implement hitch height correctly the first time, then he/she may be required to climb off of and back onto the tractor several times in order to perform the hitching operation.

In addition to a drawbar, many tractors have a three-point hitch. The three-point hitch includes a pair of draft links pivotally attached to the tractor chassis. The draft links are spaced apart and disposed at generally the same adjustable vertical height. Each of the draft links is further connected to a lift link along an intermediate portion of the draft link. Each of the lift links is attached to a laterally-disposed hydraulically-actuated rockshaft. As the shaft is actuated upwardly or downwardly, the draft links are also pivoted upwardly or downwardly via the lift links.

The three-point hitch further includes a center link pivotally connected to the tractor chassis at a location above and directly between the draft links. The center link has a connecting hole or hook formed on its rearward end. The connecting holes of the draft links and the center link are aligned with and connected to a corresponding three-point hitch structure located on an implement. After an implement has been attached to the three-point hitch of the tractor, the implement can be raised or lowered by actuating the rockshaft.

A prior art device is available for adapting the three-point hitch for attachment to an implement having a standard hitch with a clevis. This device is called a hitch bar and consists of an elongated bar with pin members extending from each end. The pin members engage the connecting holes in the ends of the draft links so that the elongated bar is supported in a horizontal orientation. The elongated bar has a plurality of hitching apertures along its length to allow adjustable connection of the implement clevis. The operator can adjust the height of the hitch bar by actuating the rockshaft of the three-point hitch.

The use of a hitch bar is disadvantageous for various reasons. First, because the hitch bar is only attached at its ends to each draft link at only one point, the bar can rotate on its longitudinal axis in its horizontally suspended position between the draft links. Incidental rotation of the bar may result in the hitching apertures of the bar not being properly aligned for attachment to the hitch of an implement. Thus, the operator may be required to rotate the bar to its proper position during the connecting operation. Further, the bar may rotate as the tractor pulls an implement attached to the bar. This can result in unwanted stresses and breakage or excessive wear in the bar, connecting pin, and implement hitch clevis.

A further disadvantage of the hitch bar is that it moves the connection of the implement to the tractor farther away from the tractor than is typical with a standard drawbar. Because of the nature of the three-point hitch, the connecting holes disposed on the ends of the draft links are positioned a substantial distance behind the end of the drawbar adjusted to its standard length. Thus, the implement is disposed further behind the tractor than is typical. When using an implement that requires connection to the power takeoff (PTO) of the tractor (for example, a baler), attachment of the implement to the hitch bar may require the use of an extra long PTO shaft to supply power to the implement. Increasing the length of the PTO shaft increases the possibility of damage to the shaft and the surrounding structures. Further, oftentimes an operator using a hitch bar with a PTO driven implement inadvertently raises the hitch bar such that it contacts the PTO shaft causing damage thereto.

It is further known within the farming industry that positioning the hitch point of the implement to the tractor at a location that is the center of the PTO shaft is advantageous. This hitching configuration results in a substantially constant driving velocity being conveyed from the tractor through the PTO shaft to the implement even during turning of the tractor. Often times, implements are constructed to provide this configuration with a drawbar adjusted to its standard length. Thus, the extended rearward position of the hitch bar does not allow this advantageous configuration. This can result in velocity fluctuations of the driven mechanisms of the implement.

In addition, tractors are often pressed into service to pull fifth wheel (gooseneck) trailers in conditions where access by a truck is difficult or impossible. Typical hitch bars, however, have no way to elevate the hitch high enough to allow the attachment of a fifth wheel type trailer.

It is often advantageous to have a type of lifting device, such as a fork lift, adapted for attachment to a tractor three point hitch. Typically the connection of such a lifting device would necessitate the removal of any equipment already connected to the three point hitch prior to installation of the lifting device.

It is further advantageous to have a hitching device which is adapted to be connected to a quick-attaching coupler for a three point hitch. The quick-attaching coupler connects to the three point hitch and generally provides three upwardly extending hooks just rearward of the distal end of the draft links and the center link respectively. Once the quick-attaching coupler is connected to the three point hitch the tractor operator can utilize the tractor hydraulic system to couple the quick-attaching coupler to all standard three-point type equipment without having to leave the tractor. One or more of the hooks is provided with a latch mechanism to prevent uncoupling of the three-point type equipment from the coupler until the latch is released by the tractor operator.

Thus, a hitching device is needed which can be attached to the three-point hitch, or to a quick-attaching coupler already attached to the three-point hitch, to allow adjustment of the vertical height of the hitching aperture relative to the drive vehicle. Further, a hitching device is needed which is stably secured to the three-point hitch so as to prevent inadvertent rotation. Further, a hitching device is needed which allows connection of the implement to a drawbar disposed at its standard length so that it can be driven with a tractor PTO shaft in a normal advantageous manner. The hitching device should allow free, unimpeded access to the PTO drive on the tractor. Further, a hitching device is needed which allows the connection of either a fifth wheel trailer or a standard trailer. Finally, a hitching device is needed which can serve double duty for both hitching and as a fork lift or round bale lift.

SUMMARY OF THE INVENTION

A hitching device for attachment to a three-point hitch of a vehicle has a frame removably coupled to and extending between the draft links of the three-point hitch. The frame has a horizontal member adapted to allow attachment of an implement. The horizontal member is disposed at a location that is below the draft links and that is forward of the ends of the draft links so that the horizontal member is closer to the drive vehicle than the ends of the draft links. The frame is open in the center to allow unimpeded access to the PTO drive on a tractor.

An alternative embodiment of hitching device includes a pair of draft link receiving members arrayed just inside of respective vertical frame members on either side of a generally rectangular frame with a center link receiving member positioned beneath a top frame member of the frame. An elevated hitch ball receiving bore extends through the top frame member for accommodating a fifth wheel trailer hitch while an adjustable drawbar tongue extends through a slot in a bottom frame member. A pair of tine receiving slots are positioned in the two lowermost corners of the frame for receiving a respective pair of rearwardly extending fork lift tines.

Another embodiment is adapted for coupling to a quick-attaching coupler mounted to the three-point hitch. An automatic latching mechanism is provided on the bottom frame member of the hitching device to allow the hitching device to be coupled to an implement without the operator having to dismount from the vehicle or tractor.

OBJECTS AND ADVANTAGES OF THE INVENTION

Accordingly, it is a primary object of the present invention to provide a hitching device that may be coupled to or in association with a three-point hitch, such as a three point hitch of a tractor, so that the height of the device can be adjusted for easy attachment to an implement.

An additional important object of this invention is to provide a hitching device which is securely attached in association with the three-point hitch so that a stable attachment is obtained between the implement and the hitching device.

A further important object of this invention is to provide a hitching device which allows attachment of an implement to a tractor through the tractor's three-point hitch at a location that is closer to the tractor than prior art devices. This attachment allows an advantageous spatial relationship between the PTO shaft and the hitch point so that an implement can be driven by the tractor at a substantially constant velocity during turning of the tractor. As a result of achieving the foregoing object, the length of the PTO shaft of the implement is also limited so that the possibility of damage to the shaft and surrounding structures is reduced.

A further important object of this invention is to provide a hitching device which allows attachment of a fifth wheel trailer to a tractor via the tractor's three-point hitch at a location that is closer to the tractor than prior art devices.

A further important object of this invention is to provide a hitching device which can double as a fork lift or a round bale lift and transport mechanism in addition to serving as a hitching device.

A further important object of this invention is to provide a hitching device which is readily coupled to a quick-attaching coupler mounted to a three-point hitch and to provide such a hitching device having an automatic latching mechanism on a bottom frame member to permit automatic coupling of an implement thereto.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

These and other important aims and objectives of the present invention will be further described, or will become apparent from the following description and explanation of the drawings, wherein.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

First Embodiment of Hitching Device

Figure 3:
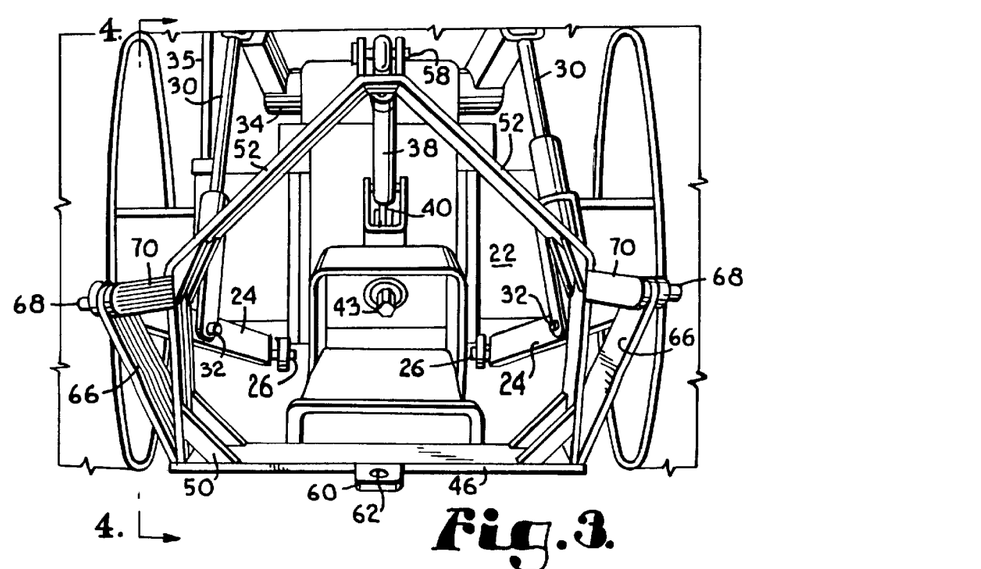
FIG. 3 is a rear perspective view of the hitching device shown in FIG. 1 attached to the three-point hitch structure located on the back of a tractor.
Figures 4, 5:
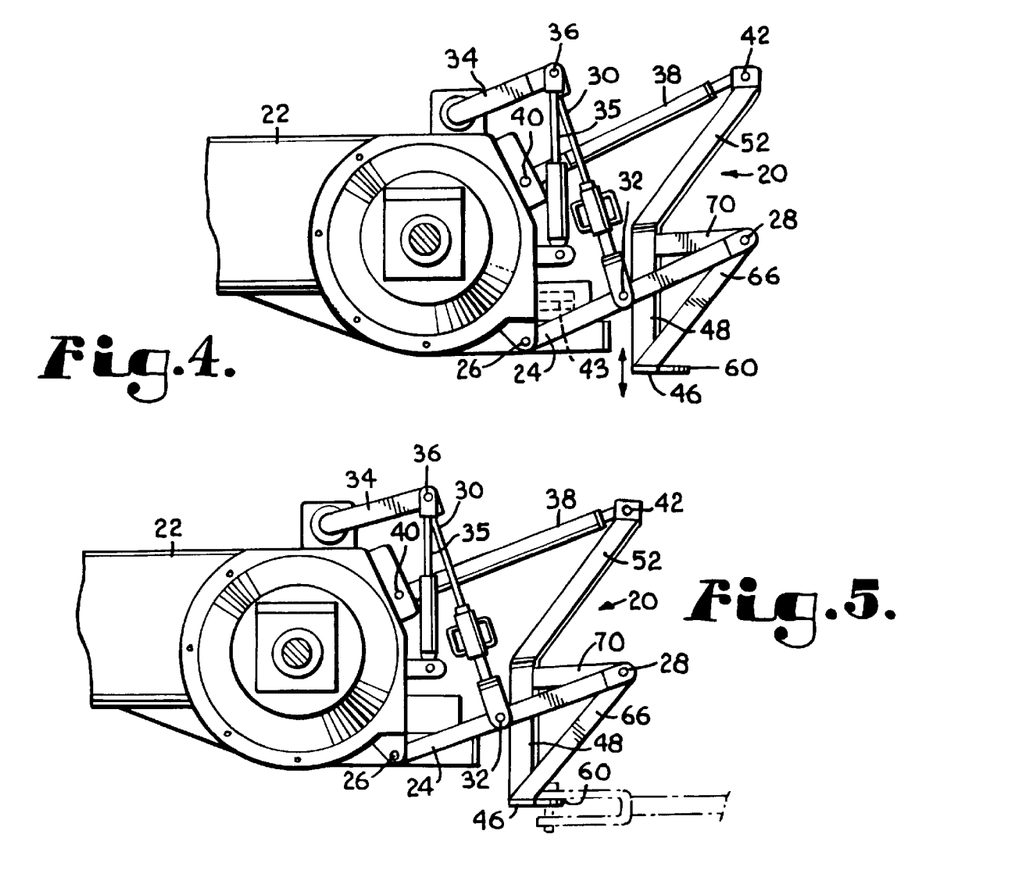
FIG. 4 is a detailed cross-sectional view generally along line 4—4 of FIG. 3 and showing the hitch device in an elevated position.
FIG. 5 is a view similar to FIG. 4, but showing the hitching device in a lowered position with the hitch of an implement and the hitch pin shown in phantom lines.

A first embodiment of a hitching device embodying the principles of this invention is broadly designated in the drawing FIGS. 1–8 by the reference numeral 20. Device 20 is shown attached to a three-point hitch disposed on the rearward end of a chassis 22 of a tractor as shown in FIGS. 3–5. The three-point hitch of the tractor includes a pair of draft links 24 which are each pivotally secured on one end to chassis 22 of the tractor at pivot point 26. The rearward end of each link 24 has a laterally disposed attaching hole 28 formed therein. Each of links 24 is attached at an intermediate location to a lift link 30 by a pin arrangement 32. The upper end of each lift link 30 is attached to a generally U-shaped rockshaft 34 by a pin arrangement 36. Rockshaft 34 is capable of being rotated upwardly and downwardly by a suitable hydraulic actuator 35. As rockshaft 34 is rotated upwardly, draft links 24 are pivoted upwardly via lift links 30. As rockshaft 34 is rotated downwardly, draft links 24 are pivoted downwardly via lift links 30.

The three-point hitch of the tractor further includes a center link 38 pivotally attached to tractor chassis 22 at pivot point 40. Center link 38 has an attaching hole 42 formed on its rearward end. Instead of having hole 42 formed on its end, center link 38 can also have a hook formed thereon with a locking structure to secure a pin-like member within the hook.

Figures 1, 2:
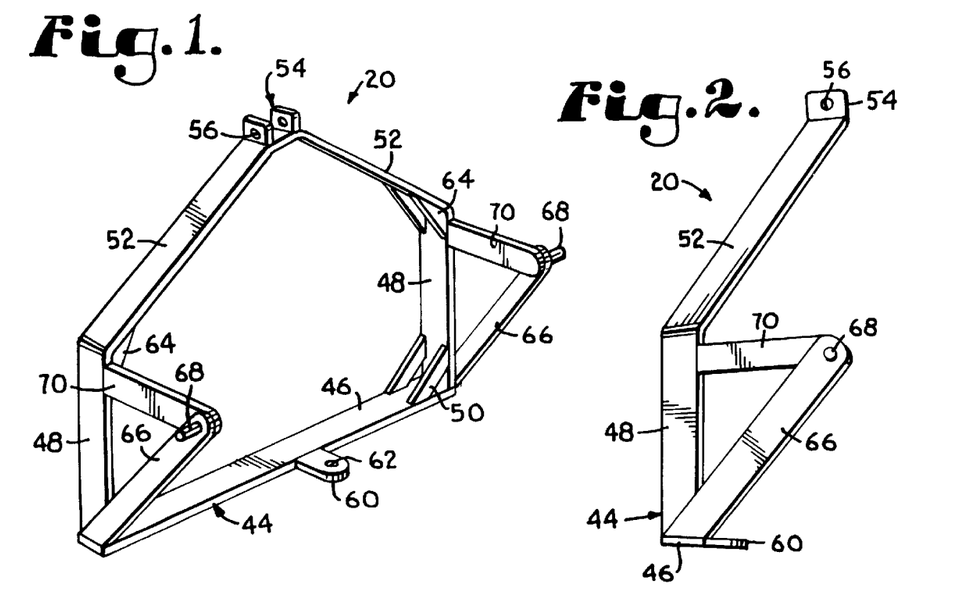
FIG. 1 is a top perspective view of a first embodiment of a hitching device embodying the principles of this invention.
FIG. 2 is a side elevational view of the hitching device shown in FIG. 1.

Device 20 has a frame 44 extending between draft links 24, as best shown in FIGS. 1–3. Frame 44 has a generally horizontal plate 46 and a pair of vertical plates 48. Plates 48 extend upwardly from opposite ends of horizontal plate 46. Plates 48 are supported in their vertical orientation by braces 50.

Each of plates 48 has a center link connecting plate 52 extending from its upper edge. Connecting plates 52 are angled inwardly toward one another and are connected together to form an upwardly opening clevis 54. Clevis 54 is laterally positioned at the midpoint of horizontal plate 46. Each of the clevis arms has a connecting aperture 56. A pin 58 is received in connecting holes 56, as best shown in FIG. 3. Clevis 54, holes 56 and pin 58 are used to connect device 20 to center link 38. More particularly, hole 42 of link 38 is aligned with holes 56 and pin 58 is inserted into the aligned holes. Further, if link 38 has a hook disposed on its end, link 38 can be pivoted downwardly until the open portion of the hook engages pin 58 disposed in holes 56.

A tongue 60 extends rearwardly from horizontal plate 46. Tongue 60 has a hitch aperture 62 formed therein and for connection to the clevis of an implement. Braces 64 are attached to plates 48 and plates 52 to support plates 52 in their inwardly extending orientation.

A pair of draft link connecting plates 66 are attached to and extend upwardly and rearwardly from horizontal plate 46. Plates 66 are disposed on opposite ends of plate 46. Each plate 66 is also connected to the lower portion of its corresponding vertical plate 48. Each plate 66 has a pin member 68 extending orthogonal to and outwardly from its rearward end. Pin members 68 engage respective attaching holes 28 of draft links 24 to secure device 20 to the draft links. A key (not shown) can be used to secure each of the pin members within its respective attaching hole.

Each plate 66 has a brace 70 extending toward and attached to the upper portion of the corresponding vertical plate 48. Braces 70 serve to support connecting plate 66 in their angled position.

When device 20 is attached to a tractor as shown in FIGS. 3–5, tongue 66 is disposed at a location that is below draft links 24. Farther, the position of tongue 60 is closer to the tractor than the rearward ends of draft links 24 with the attaching holes 28 disposed thereon. This location of tongue 60 with hitch aperture 62 therein is substantially the location that a drawbar would be in when the drawbar is adjusted to its standard length. Further, the attachment of device 20 to the three-point hitch of the tractor by pin members 68 and pin 58 prevents rotation of tongue 60 with respect to draft links 24.

In order to adjust the height of tongue 60 during the hitching of an implement, the operator simply actuates the three-point hitch to move the draft links, and the device 20 attached thereto upwardly or downwardly. The tongue is shown in an elevated position in FIG. 4 and in a lowered position in FIG. 5. Because of the attachment of device 20 to both of the draft links and to the center link, the tongue will be maintained at an orientation that is substantially parallel to the ground whether the device is elevated or lowered.

Because tongue 60 is disposed the same distance from the tractor as is a typical drawbar adjusted to its standard length, a PTO-driven implement specifically designed for a drawbar having a standard length maintains its constant velocity characteristics. That is, numerous implements are designed so that with a drawbar having a standard length, the hitch point between the draw bar and the implement is approximately at the midpoint of the PTO shaft extending from the implement. This design characteristic allows for transfer of constant velocity power from the tractor to the implement even during turning. Additionally, the close-in positioning of the tongue limits the need for using an excessively long PTO shaft which is more likely to be damaged or damage surrounding structures. Because the tongue is disposed a distance below draft links 24 as opposed to at the same level as the draft links, the tongue is less likely to interfere with or contact a PTO shaft extending from an implement to the PTO hub 43 located on tractor chassis 22 even if the tongue is inadvertently raised by the operator.

The device 20 can be easily fabricated by welding the plates and braces comprising the structure together at their connection locations.

Second Embodiment of Hitching Device

Figures 6, 7:
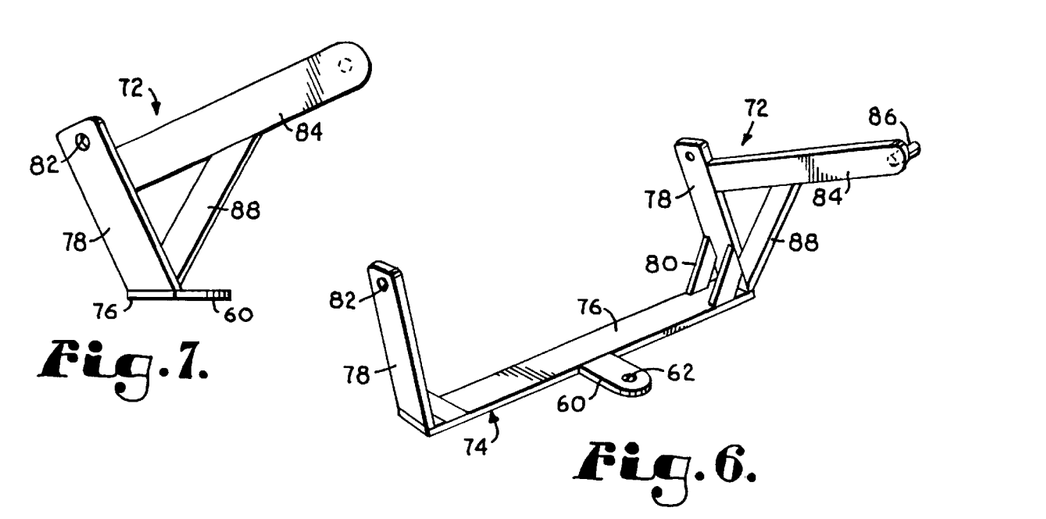
FIG. 6 is a top perspective view of a second embodiment of the present invention.
FIG. 7 is a side elevational view of the hitching device shown in FIG. 6.
Figure 8:
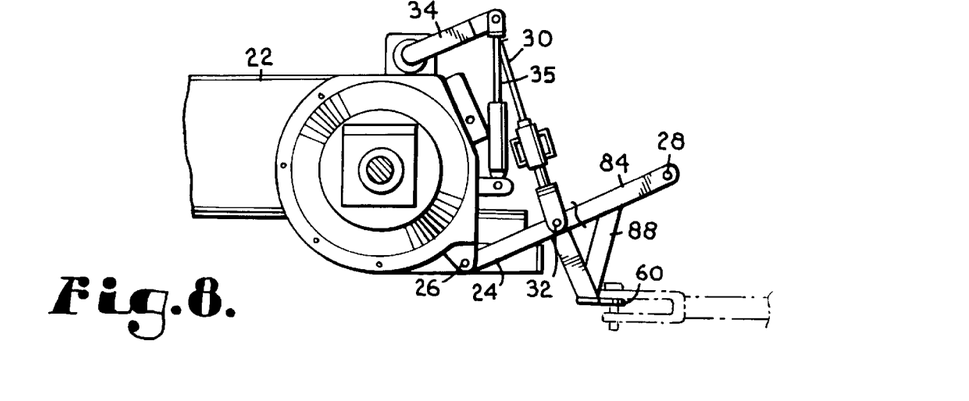
FIG. 8 is a view similar to FIG. 5 but showing the hitching device shown in FIG. 6 attached to the three-point hitch of the tractor, parts being broken away to reveal details of construction.

A second embodiment of this invention is shown in FIGS. 6–8 and broadly designated by the reference numeral 72. In the description of hitching device 72, parts similar to those of hitching device 20 are indicated with like reference numerals. Device 72 has a frame 74 which extends between draft links 24. Frame 74 has a generally horizontal plate 76 and a pair of upwardly extending plates 78. Plates 78 extend upwardly and slightly forwardly from opposite ends of plate 76. Plates 78 are supported in their upward orientation by braces 80. Horizontal plate 76 has a tongue 60 with a hitch aperture 62.

Each of plates 78 has a connecting hole 82 formed adjacent its upper end. Holes 82 are used to connect frame 74 to the draft links. More particularly, each hole 82 receives the pin of one of pin arrangements 32. Arrangements 32 are used to attach lift links 30 to draft links 24. Thus, plates 78 are attached to draft links 24 at the locations where the lift links are attached to the draft links. Plates 78 can be held on the pins of pin arrangements 32 by a key (not shown).

A connecting plate 84 is attached to and extends rearwardly from one of plates 78. Plate 84 has pin member 86 extending outwardly and orthogonal to its rearward end. Pin member 86 is for engagement with the attaching hole 28 of one of draft links 24. Pin member 86 can be held in attaching hole 28 by a key (not shown). A brace 88 is used to support plate 84 in its rearwardly extending orientation. Brace 88 extends generally from the midpoint of plate 84 to the lower end of plate 78.

Device 72 is securely attached to the three-point hitch at pin arrangements 32 and at the attaching hole 28 of one of draft links 24. The attachment plate 84 to hole 28 of draft link 24 through pin member 86 ensures that frame 74, and thus tongue 60, does not pivot with respect to the draft links. Device 72 is not connected to the center link of the three-point hitch. Thus, the center link can be located in a storage position or completely removed from the tractor as shown in FIG. 8.

As with device 20 described above, the height of tongue 60 of device 72 is adjustable by manipulating the three-point hitch from the operator's platform of the tractor. Also, the tongue is disposed at a position that is below the draft links and that is closer to the tractor than the ends of the draft links. The tongue is positioned generally at the location where the drawbar of the tractor would be positioned when it is adjusted for its standard length. Therefore, device 72 has the earlier described advantages of device 20.

The device 72 can be easily fabricated by welding the plates and braces comprising the structure together at their connection locations.

Third Embodiment of Hitching Device

Referring to FIGS. 9–13, a third embodiment of a hitching device is generally indicated at 100. The hitching device 100 includes a generally rectangular, open frame including a top frame member 102, a bottom frame member 104, and left and right vertical side frame members 106 and 108, respectively. A pair of generally trapezoidal shaped draw link receiving frames 110 and 112 are attached to the rear of the side frame members 106 and 108, respectively. Each of the draw link receiving frames 110 and 112 includes a transversely extending bore 113 for accommodating a pin 114. Each pin 114 is adapted to extend through a respective terminating eyelet 116 in draw links 118 and 120. The hitching device 100 thus is supported by the draw links 118 and 120 in a position forward from the terminating eyelets 116 of the draw links 118 and 120 such that a draw bar tongue 122 can be positioned in a normal towing position, as described above with reference to FIGS. 1–8. The placement of the draw link receiving frames 110 and 112 in a position inside of the vertical side frame members 106 and 108, respectively, allows the raising and lowering of, as well as limited side to side movement of the inventive hitching device 100 without interference between the draw links 118 and 120 and the side frame members 106 and 108. Furthermore, the large open space in the middle of the hitching device 100 allows free access to the PTO drive of a tractor (not shown) for convenient connection of a PTO shaft, such as the shaft 121.

The draw bar tongue 122 extends through a slot 124 in the bottom frame member 104 and includes a number of vertically oriented bores 125 therethrough for accepting hitch balls such as the ball 126, and a positioning pin 128. The draw bar tongue 122 is thus adjustable fore and aft relative to the hitching device 100.

Attached beneath the top frame member 102 is a center link receiving frame 130 which includes a horizontally extending bore 132 for accommodating a pin 134. The pin 134 is adapted for insertion through a terminating eyelet 136 in a center link 137 to allow the top of the hitching device 100 to be supported thereby. The frame 130 has a top plate 138 with a vertical bore therethrough for accommodating a hitch ball 140. The hitch ball 140 is thus positioned at an appropriate (adjustable) height to accommodate a hitch from a fifth wheel trailer (not shown). The hitching device 100 can thus be used to tow conventional trailers, such as a trailer 142, a tongue of which is shown broken away in FIG. 10, or a fifth wheel trailer.

An added feature of the alterative hitching device 100 is the provision of a pair of removable fork lift tines 143 and 144. The tines 143 and 144 are preferably made of lengths of rectangular steel tubing with tapered ends 145. A respective pair of tine receiving receptacles 146 and 147 are positioned in respective lowermost corners of the hitching device 100. Each tine receiving receptacle 146 and 147 comprises a length of rectangular tubing with a vertically oriented bore 150 extending therethrough to accommodate a pin 152. Each tine 143 and 144 has a matching through bore 154 for receiving the corresponding latch pin 152 therein. The tines 143 and 144 are insertable in the respective receptacles 146 and 147 where they are locked in place via the pins 152. Since the bottom frame member 104, once the tractor rockshaft is lowered to its lowermost position, is placed at ground level, the tines 143 and 144 can be used in a manner similar to a fork lift. The hitching device 100 thus doubles as a fork lift or round bale lift and transport device. Furthermore, this ground level position of the bottom frame member 104 allows the hitching of trailers without requiring lifting or jacking of the trailer tongue.

Figures 9, 13:
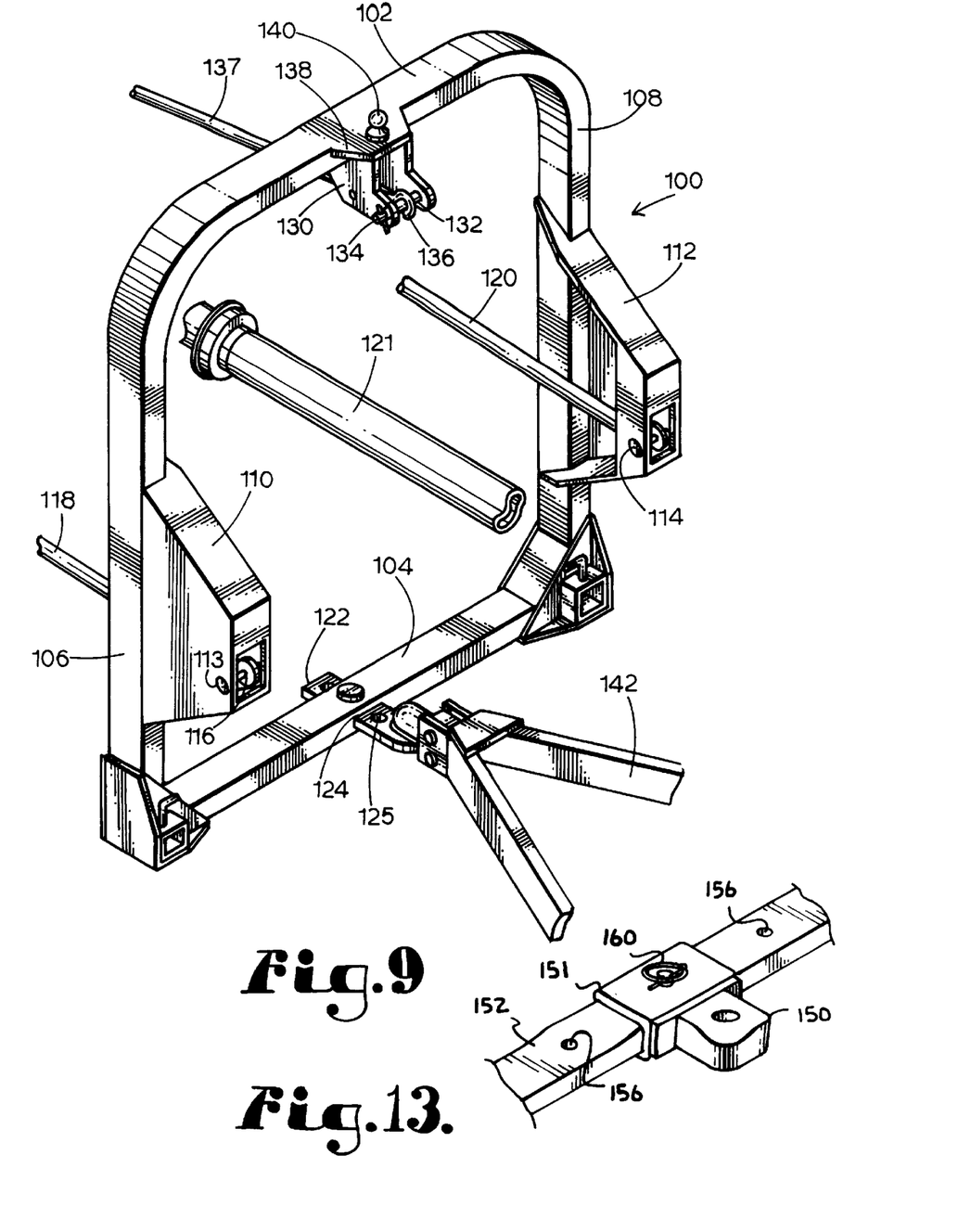
FIG. 9 is a perspective view of an alternative embodiment of hitching device equipped with a fifth wheel (gooseneck) trailer hitch, a conventional trailer hitch on an adjustable drawbar, and a pair of removably attached fork lift members.
FIG. 13 is a fragmentary perspective view of showing a variation of the adjustable drawbar as shown in FIG. 9.
Figure 10:
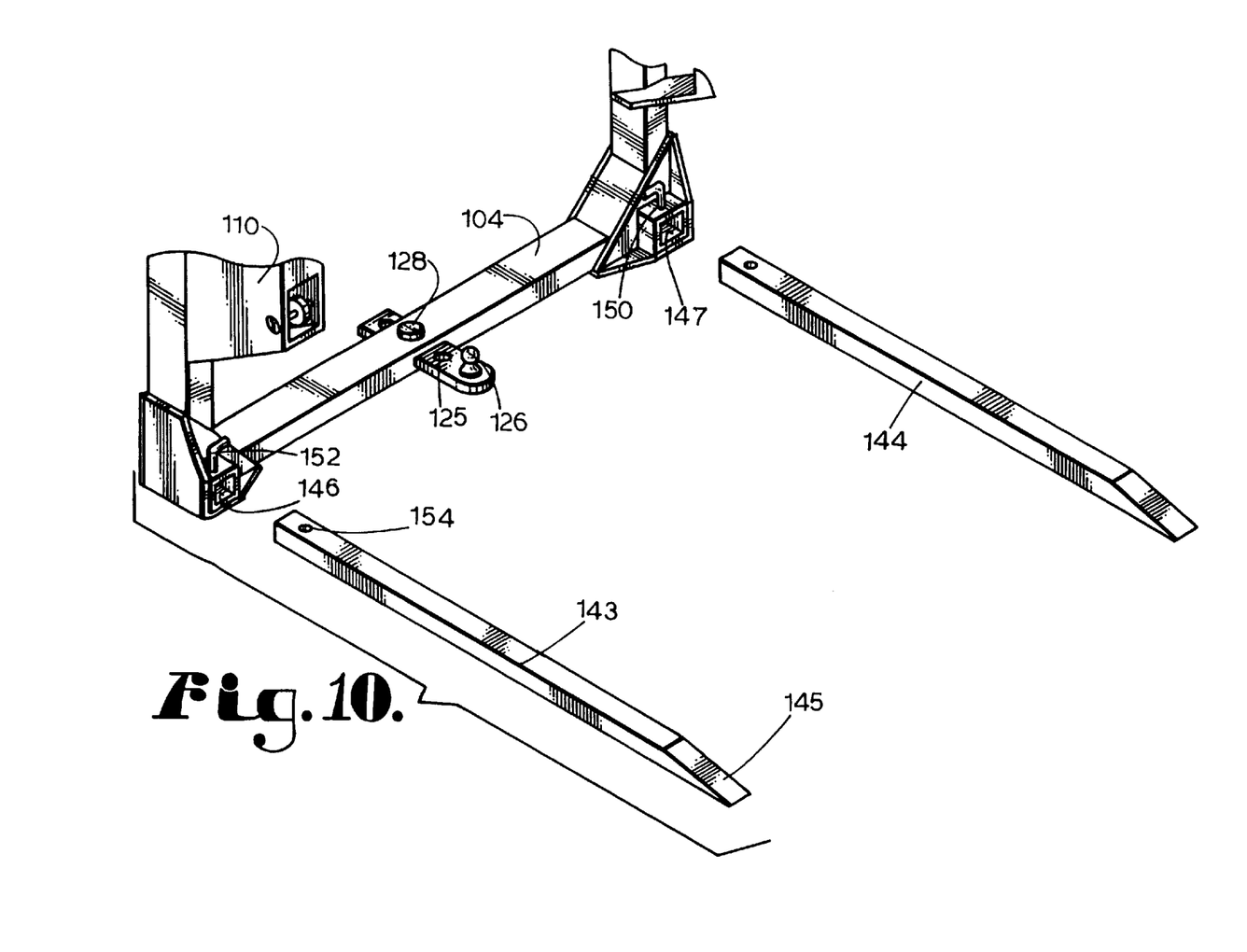
FIG. 10 is a fragmentary, perspective view of the lowermost portion of the hitching device of FIG. 9, with the fork lift members removed.
Figure 11:
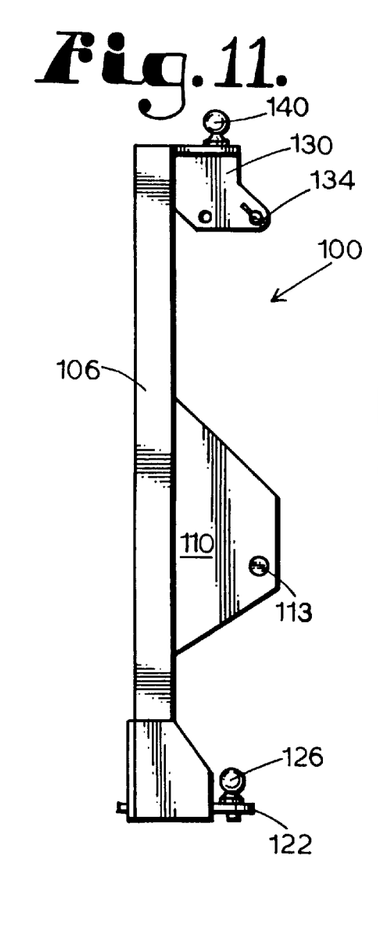
FIG. 11 is a side elevational view of the hitching device of FIG. 9.
Figure 12:
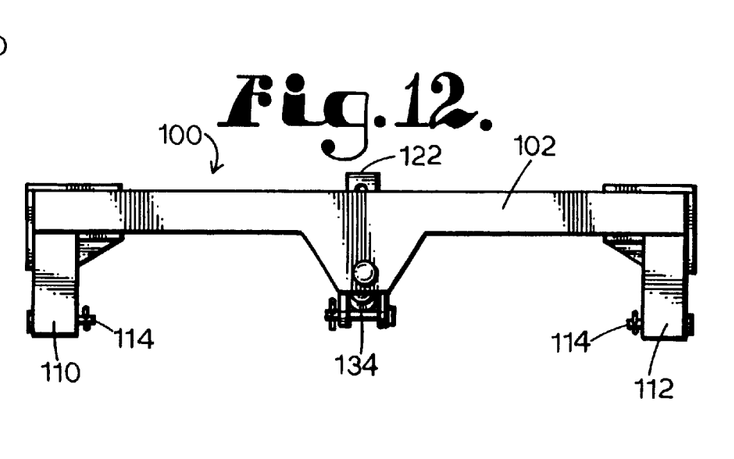
FIG. 12 is a top plan view of the hitching device of FIG. 9.

It is also foreseen that the draw bar tongue could be mounted for side to side adjustment along the bottom frame member as generally shown in FIG. 13 which shows a variation of the hitching device as shown in FIG. 9. A draw bar tongue 150 is shown mounted on a rectangular sleeve 151 which is slidingly mounted on bottom frame member 152. A vertically oriented bore 155 (not shown) in the sleeve 151 is alignable with one of several vertically oriented bores 156 along the length of the bottom frame member 152 for reception of a pin 160 for fixing the location of the draw bar tongue 150. It is also foreseeable that the draw bar tongue could be mounted to allow both side to side and front to back adjustment.

Fourth Embodiment of Hitching Device

FIGS. 14–18 disclose a fourth embodiment of a hitching device 200 which is adapted to be quickly connected to a quick-attaching coupler 201 mounted on a three-point hitch for vehicle such as a tractor 202 or which may be mounted directly to the three-point hitch.

The quick-attaching coupler 201 as shown in FIGS. 1 and 2, is of a commercially available type, having a top frame member 203 and left and right side frame members 204 and 205 respectively. Lower ends of the side frame members 204 and 205 are generally slotted to receive distal ends of draft links 208 and 209 respectively. Link pins 210 and 211 are inserted through aligned apertures (not shown) extending through the side frame members 204 and 205 and the associated distal end of draft links 208 and 209 for securing the side frame members 204 and 205 thereto. A distal end of center link 214 of the three-point hitch is securable to a clevis 215 mounted on top of the top frame member 203 by a link pin 216 inserted through aligned apertures in the clevis 215 and the distal end of the center link 214.

Three upwardly opening hooks or hook-like members 217, 218 and 219, which may also be referred to as coupling members, are mounted on the rear of quick-attaching coupler 201 generally just rearward of the point of attachment of the coupler 201 with the distal ends of the draft links 208 and 209 and center link 214 respectively. Latch bars 222 and 223 are pivotally mounted to side frame members 204 and 205 respectively within slots therein such that lower ends of the latch bars 222 and 223 pivot into the respective slots in the side frame members 204 and 205 when acted upon by gravity alone. Lower ends of a pair of spring biased rods (not shown) engage an upper surface of each latch bar 222 and 223 forward of the pivot point so as to biasingly pivot the lower ends of the latch bars 222 and 223 rearward, out of the slots and across the recess in the respective hooks 217 and 218. Upper ends of the spring biased rods are connected to cammed levers 226 and 227 which can be used to draw the spring biased rods out of engagement with the latch bars 222 and 223 respectively which allows the lower ends of the latch bars 222 and 223 to swing back into the respective slots and away from the recesses of the hooks 217 and 218. The three hooks 217, 218 and 219 function as a three-point hitch which is readily connectable to a three-point implement including the hitching device 200.

The hitching device 200 includes a generally rectangular, open frame including a top frame member 230, a bottom frame member 231, and left and right vertical side frame members 232 and 233, respectively. Side frame members 232 and 233 are angled rearward from the bottom frame member 231 to the top frame member 230 such that the bottom frame member 231 is generally positioned forward of the top frame member 230 relative to a tractor or other vehicle to which the hitching device 200 is to be attached.

A pair of coupling member receiving frames 238 and 239 extend rearwardly from the side frame members 232 and 233, respectively. Outer panels, plates or walls 238a and 239a of coupling member receiving frames may be considered part of the side frame members 232 and 232 respectively and may be integrally formed therewith. A bore extends transversely through each of the coupling member receiving frames 238 and 239 for accommodating support pins 241 and 242 respectively. Pins 241 and 242 are adapted to be engaged by respective hooks 217 or 218 of the quick-attaching coupler 201 for securing the device 200 to the coupler 201 or to be inserted through respective terminating eyelets or holes (not shown) in the distal ends of draft links 208 and 209 respectively for securing the hitching device 200 directly thereto. The distal ends of the draft links 208 and 209 and center link 214 through which the eyelets extend may also be referred to as coupling members.

A slotted bracket or coupling member receiving bracket 245, formed from two angle irons, is mounted on a front surface of the hitching device top frame member 230. Two sets of bores 246 and 247 extend horizontally through the bracket 245, each set of bores adapted to accommodate a support pin 248. The pin 248 is adapted to be engaged by hook 219 of the quick-attaching coupler 201 or for insertion through an eyelet or hole (not shown) in the distal end of center link 214 to allow the top of the hitching device 200 to be supported thereby.

The support pins 241 and 242 are generally supported inward from the respective side frame member 232 and 233 and generally medially between the top frame member 230 and the bottom frame member 231 such that the bottom frame member 231 is spaced below and forward of the support pins 241 and 242.

An automatic latching mechanism 255 is mounted on the bottom frame member 232 which generally functions as a tow bar such that the hitching device is particularly well adapted for towing trailer type devices. The bottom frame member 232 includes a top plate 256, bottom plate 257 and spacers 258 and 259. A tongue 263 is integrally formed on the top plate 256 and extends rearwardly therefrom. A beveled slot 264 is formed in the tongue 263 and opens rearwardly or outwardly. A latch plate 266 is pivotally mounted in a space below the tongue 263, between the top and bottom plates 256 and 257 and between spacers 258 and 259. The latch plate 266 is mounted on post 267 extending between the top and bottom plates 256 and 257.

Figure 17:
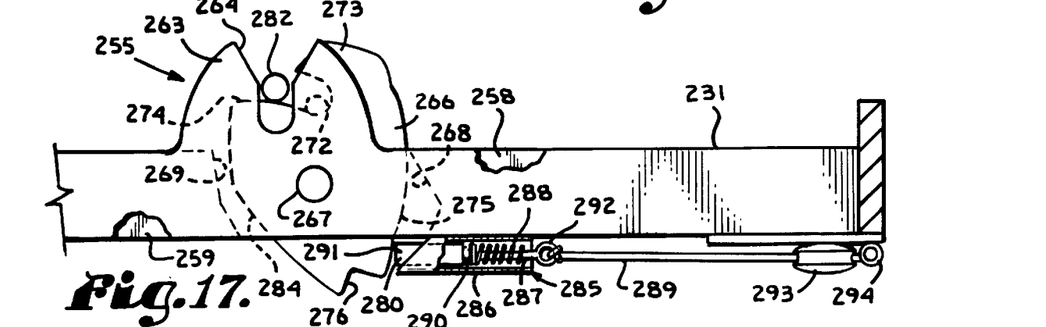
FIG. 17 is a fragmentary and enlarged view taken generally along line 17—17 of FIG. 16 showing an automatic latching mechanism in an open alignment with portions broken away to show detail.
Figure 18:
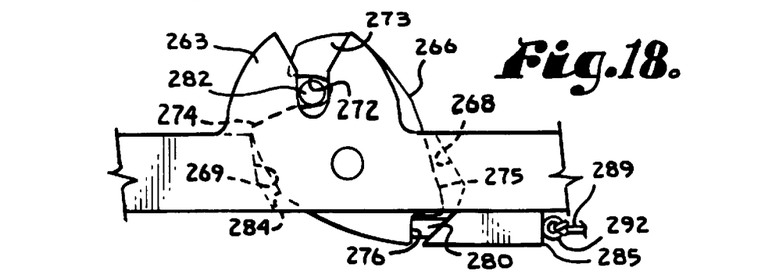
FIG. 18 is a fragmentary view similar to FIG. 17 and showing the latching mechanism in a closed or latched alignment.

The latch plate 266 is generally pivotal about post 267 between an open and a closed alignment relative to the tongue 263 as shown in FIGS. 17 and 18 respectively. Inner edges 268 and 269 of spacers 258 and 259, shown in phantom lines in FIGS. 17 and 18, act as stops preventing overrotation of the latch plate 266 relative to the tongue 263. A curved slot 272 is formed in the latch plate 266 toward the rear thereof so as to form a hook portion 273 extending across approximately half of the rear end of the latch plate 266. A rearwardly directed surface or outwardly facing wall 274 of the latch plate 266 on the opposite side of the slot 272 as the hook portion 273 is curved inwardly and eccentrically relative to the post 267. A side 275 of the latch plate 266 opposite the direction of opening of slot 272 is similarly curved inwardly and eccentrically relative to the post 267 and a cutout or notch 276 is formed in the latch plate 266 at a front end thereof.

When the latch plate 266 is in the open position, the hook portion 273 and the curved slot generally extend to the side of the beveled slot 264 in tongue 263, the rearwardly directed surface 274 of the latch plate 266 extends across the beveled slot 264, and a spring biased locking bar 280 biasingly engages the side 275 of the latch plate 266 rearwardly of the notch 276.

As the latching mechanism 255 is advanced into engagement with an implement hitch pin 282, the hitch pin 282 engages the rearwardly directed surface 274 of the latch plate 266, whereby the inwardly and eccentrically curved shape of the surface 274 causes the latch plate 266 to rotate such that the hook portion 273 rotates across the beveled slot 264 and the hitch pin 282 is positioned in the curved slot 272. As the hook portion 273 is advanced across the beveled slot 264, the side 275 of the latch plate 266 rotates relative to the locking bar 280 until the notch 276 is advanced into alignment with the locking bar 280, such that the locking bar 280 is urged into the notch 276. Further, rotation of the latch plate, in the same direction is prevented by engagement of an opposite side 284 of the latch plate 266 against inner edge 269 of spacer 259. When the locking bar 280 is positioned in the notch 276 such that the hook extends across the beveled slot 264, the latch 266 is considered in the closed position.

Engagement of the latch plate 266 by the locking bar 280 within the notch 276 prevents rotation of the latch plate back to the open position. The spring biased locking bar 280, is part of a locking mechanism 285 further comprising sleeve 286, shaft 287, spring 288, and pull cord 289.

The locking bar 280 is slidably mounted within the sleeve 286 which is mounted to a front edge of the spacer 258. A first end of the sleeve 286, closest the latch plate 266, is open and angled inward toward the spacer and away from the latch plate 266. A second end of the sleeve 286 is capped with a bore extending therethrough. The shaft 287 is mounted to the locking bar 280 on a first end 290 thereof, opposite the latch plate 266. The shaft 287 extends through the bore in the capped end of the sleeve 286. The spring 288 is positioned around the shaft 287, between the locking bar first end 290 and the capped end of the sleeve 286 such that the spring biasingly urges a second end 291 of the locking bar 280 out of the first end of the sleeve 286 and into engagement with the side 275 of the latch plate 266.

The cord 289 is secured to a distal end 292 of the shaft 287. The cord 289 extends around a pulley 293 and is threaded through a tube 294 extending upward along side frame member 232. A distal end of the cord 289 may be secured in the cab of a tractor to which the device 200 is attached to pull the locking bar 280 out of engaging relationship with the notch 276 in latch plate 266, to allow the latch plate 266 to pivot back to the open position and to allow withdrawal of the hitch pin 282 therefrom.

The hitching device 200 also includes a pair of removable fork lift tines 295 and 296 removably securable within tine receiving receptacles 297 and 298 positioned in respective lowermost corners of the hitching device 200 in a manner similar to that disclosed in the embodiment shown in FIGS. 9–12.

The tines 295 and 296 are useful for supporting the hitching device 200 in an upright orientation to permit coupling with the quick-attaching coupler 201. With the hitching device 200 supported upright, the quick-attaching coupler 201 connected to a three point hitch of the tractor 202 is lowered and the tractor 202 is backed up until the hooks 217, 218 and 219 are positioned below and in alignment with corresponding support pins 241, 242 and 248 on the hitching device 200. The quick-attaching coupler 201 is then raised hydraulically until the pins 241, 242 and 248 are supported in the recesses of hooks 217, 218 and 219 respectively. As hooks 217 and 218 are raised relative to pins 241 and 242, the pins 241 and 242 engage latch plates 222 and 223 respectively and urge the latch plates 222 and 223 out of covering relationship with the recesses of hooks 217 and 218. When the pins 241 and 242 are seated in the recesses of hooks 217 and 218 the latch plates are biasingly urged back across the pins 241 and 242 to secure the pins 241 and 242 in place.

To release the hitching device 200 from the quick-attaching coupler 202, the tractor operator disengages the latch plates 222 and 223 by raising the cammed levers 226 and 227 as discussed above which causes the latch plates 222 and 223 to pivot out of covering relationship with the pins 241 and 242 and back into the slots in the left and right side frame members 204 and 205. The quick-attaching coupler 201 is then lowered hydraulically until the hitching device 200 is supported on the ground, the coupler 201 is further lowered until the hooks 217, 218 and 219 drop below pins 241, 242 and 248 respectively and the tractor 202 is then advanced forward to pull the coupler 201 clear of the hitching device 200.

The hitching device 200 may be attached directly to the draft links 208 and 209 and center link 214 of the tractor three-point hitch via insertion of support pins 241 and 242 through aligned apertures in the distal ends of links 208 and 209 and the coupling member receiving frames 238 and 239 and insertion of pin 248 through the aperture in the distal end of center link 214 and on of the bores 246 or 247 in the slotted bracket 245.

Figures 14, 15:
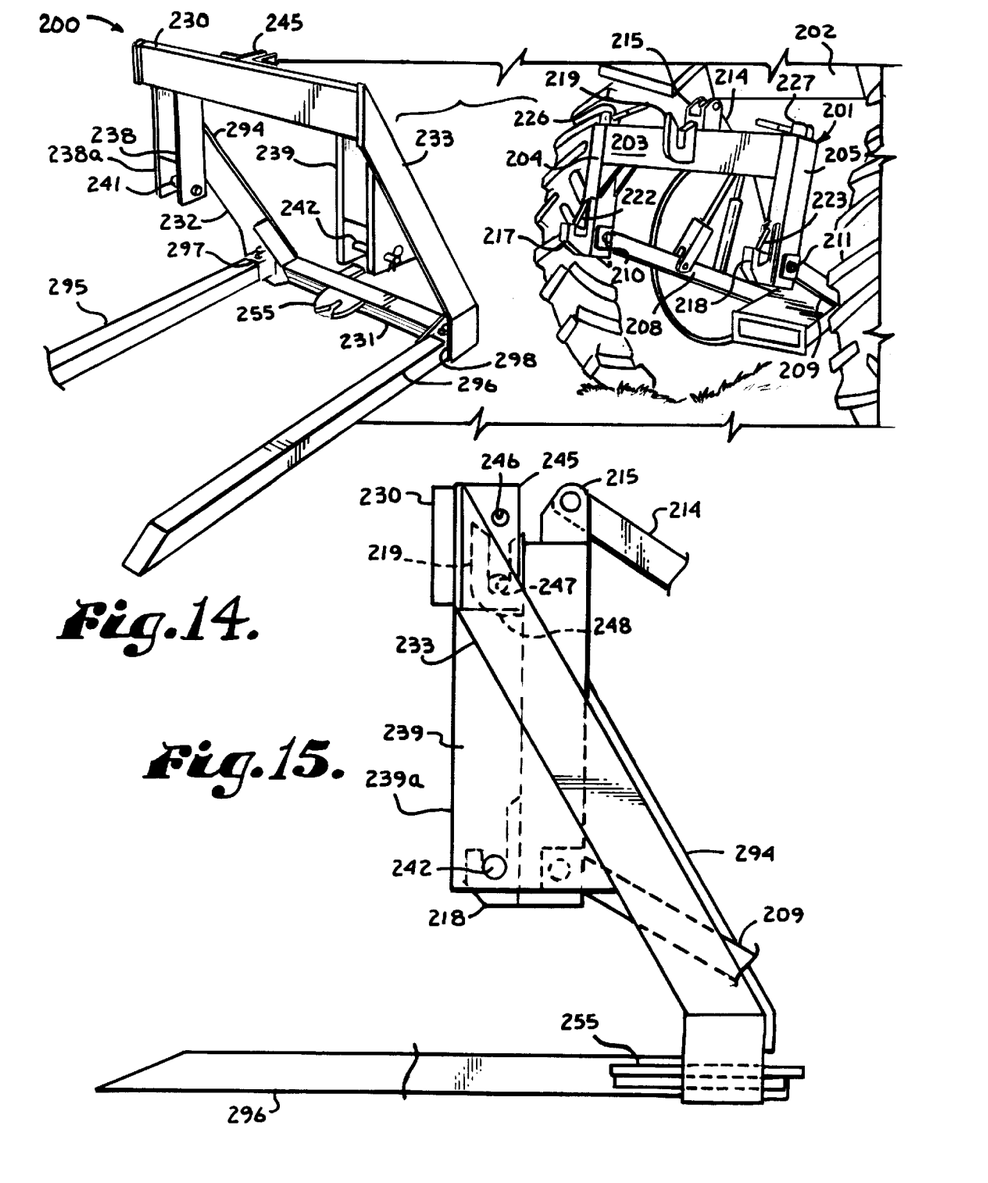
FIG. 14 is an exploded perspective view of an alternative embodiment of the hitching device adapted for coupling to a quick attaching coupler shown mounted to the three-point hitch of a tractor.
FIG. 15 is an enlarged and fragmentary right side elevational view of the hitching device as shown in FIG. 14 secured to a quick-attaching coupler mounted on the three point hitch of a tractor.
Figure 16:
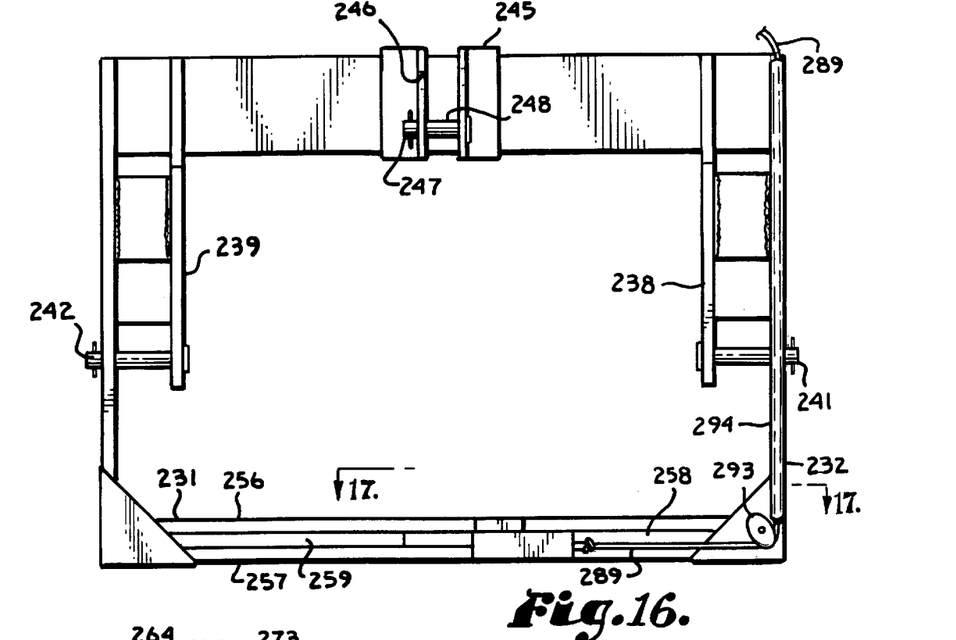
FIG. 16 is a rear elevational view of the hitching device as shown in FIG. 14.

When the hitching device 200 is supported either by the quick-attaching coupler 201 or directly to the draft links 208 and 209 and center link 214, the bottom frame member 231 and the automatic latching mechanism 255 are positioned forward of the point of contact of the support pins 241 and 242 with the distal end of the draft links 208 and 209 or with the hooks 217 and 218, such that the automatic latching mechanism 25 is generally positioned in a normal towing position. As best seen in FIGS. 14 and 15, the side frame members 232 and 233 are angled rearward from the bottom frame member 231. A substantial portion of the section of each of side frame member 232 and 233 which extends between the pins 241 and 242 and the bottom frame member 231 extends completely forward of the respective pins 241 and 242 such that when the pins 241 and 242 are engaged by hooks 217 and 218 or draft links 208 and 209, the bottom frame member 231 is entirely disposed at a location that is below the draft links 208 and 209 and that is forward of the pins 241 and 242.

The placement of the coupling member receiving frames 238 and 239 in a position inside of the vertical side frame members 232 and 233, respectively, allows the raising and lowering of, as well as limited side to side movement of the inventive hitching device 200 without interference between the draft links 208 and 209 and the side frame members 232 and 233. Furthermore, the large open space in the middle of the hitching device 200 allows free access to the PTO drive of a tractor (not shown) for convenient connection of a PTO shaft.

When the bottom frame member 231 is raised to a towing height with an implement secured to the automatic latching mechanism 255, the PTO shaft generally extends laterally between side frame members 232 and 233 and vertically between bottom of the coupling member receiving frames 238 and 239 and the top of the bottom frame member 231 allowing a relatively sharp turning radius of the tractor 202 relative to the towed implement without engagement of the PTO shaft against one of the side frame members 232 and 233. Further, extension of the lower sections of the side frame members 232 and 233 entirely forward of the pins 241 and 242 permits the PTO shaft to pivot relatively widely beneath the support pins 241 and 242 without engaging one of the side frame members 232 and 233 which increases the turning radius of the towed implement relative to the tractor.

It is foreseen that the quick-attaching coupler 201 could be modified to include the advantages of the present invention. In particular, the quick-attaching coupler 201 could be modified to include additional side frame members extending at an angle downward and forward relative to the coupler side frame members, such that a bottom frame member having a hitch or latch secured thereto is positioned forward of the point of connection of the draft links 208 and 209.

It is to be understood that while certain forms of the present invention have been illustrated and described herein, it is not to be limited to the specific forms or arrangement of parts described and shown.

What is claimed and desired to be secured by Letters Patent is as follows:

1. A hitching device for use in association with a three-point hitch, the three point hitch including a center link positioned above and between a pair of draft links, said hitching device comprising:
    (a) a frame having a bottom frame member connected to a pair of side frame members, said bottom frame member including a hitch; and
    (b) a pair of coupling member receiving frames, each said receiving frame being attached to a respective side frame member and extending rearwardly from said respective side frame member, each said receiving frame being removably attachable to a coupling member associated with a distal end of a respective one of the draft links, the position of the coupling member receiving frames and the length of said side frame members being such that, when said coupling member receiving frames are attached to a respective coupling member, said bottom frame member is disposed at a location that is below the draft links and that is forward of the distal ends of the draft links.

2. A hitching device as in claim 1 wherein the draft links are positioned inside of said respective side frame members when said coupling member receiving frames are attached to said respective coupling members.

3. A hitching device as in claim 1 wherein said hitch is slidingly securable to said bottom frame member and wherein:
    (a) a horizontally oriented slot extends through said bottom frame member from a front end to a rear end thereof;
    (b) a vertically oriented through bore extends through said bottom frame member and across said slot; and
    (c) said hitch includes a hitch tongue having a plurality of vertically oriented through bores extending along the length thereof which are selectively alignable with said vertically oriented through bore in said bottom frame member such that a pin may be inserted therethrough to allow fore and aft adjustment of said hitch within said slot.

4. A hitching device as in claim 1 wherein said hitch is slidingly securable to said bottom frame member lengthwise relative thereto and selectively securable in multiple positions along the length of said bottom frame member.

5. A hitching device as in claim 1 wherein said coupling members comprise hooks of a quick-attaching coupler.

6. A hitching device as in claim 1 further comprising:
    (a) a pair of tine receiving receptacles positioned proximate corners between said bottom frame member and said side frame members; and
    (b) a pair of lift tines removably securable within said tine receiving receptacles.

7. A hitching device as in claim 1 wherein said hitch comprises an automatic latch.

8. A hitching device as in claim 7 wherein said automatic latch is adapted for automatically coupling to a hitch pin of a trailer type device; said automatic latch comprising:
    (a) a tongue mounted on said bottom frame member and having a slot formed therein;
    (b) a latch plate pivotally mounted on a post secured to said tongue and pivotal between an open alignment and a closed alignment relative to said tongue; said latch plate having a hook formed on and extending partially across an end of said latch plate and defining a curved slot in said latch plate extending generally transverse to said tongue slot; said hook and said latch plate slot positioned adjacent said tongue slot when said latch plate is positioned in said open alignment; said latch plate having a curved outwardly facing wall which is curved inward and eccentrically relative to said post, a first portion of which defines an inner edge of said curved latch plate slot and a second portion of which extends across said tongue slot when said latch plate is in said open alignment such that advancement of a hitch pin into said tongue slot and against said curved outwardly facing wall causes said latch plate to pivot about said post to said closed alignment such that said hook extends across said tongue slot and said hitch pin is positioned within said latch plate slot; and
    (c) a spring loaded locking mechanism mounted on said tow bar, engaging said latch plate and locking said latch plate in said closed alignment as it is advanced thereto.

9. A hitching device for use in association with a three-point hitch, the three-point hitch including a center link positioned above and between a pair of draft links, said hitching device comprising:
    (a) a frame having a bottom frame member connected to a pair of side frame members, said bottom frame member including a hitch; and
    (b) a pair of support pins each secured rearwardly of a respective one of said side frame members and adapted for engagement by a coupling member associated with a distal end of a respective draft link; at least a portion of each of said side frame members extending at an angle forward of and below said pins such that when said pins are engaged by said coupling members associated with said draft links, said bottom frame member is entirely disposed at a location that is below the draft links and that is forward of the distal ends of the draft links.

10. A hitching device as in claim 9 wherein the draft links are positioned inside of said respective side frame members when said support pins are attached to said respective coupling members.

11. A hitching device as in claim 9 wherein said hitch is slidingly securable to said bottom frame member and wherein:
    (a) a horizontally oriented slot extends through said bottom frame member from a front end to a rear end thereof;
    (b) a vertically oriented through bore extends through said bottom frame member and across said slot; and
    (c) said hitch includes a hitch tongue having a plurality of vertically oriented through bores extending along the length thereof which are selectively alignable with said vertically oriented through bore in said bottom frame member such that a pin may be inserted therethrough to allow fore and aft adjustment of said hitch within said slot.

12. A hitching device as in claim 9 wherein said hitch is slidingly securable to said bottom frame member lengthwise relative thereto and selectively securable in multiple positions along the length of said bottom frame member.

13. A hitching device as in claim 9 wherein said coupling members comprise hooks of a quick-attaching coupler.

14. A hitching device as in claim 9 further comprising:
   (a) a pair of tine receiving receptacles positioned proximate corners between said bottom frame member and said side frame members; and
   (b) a pair of lift tines removably securable within said tine receiving receptacles.

15. A hitching device as in claim 9 wherein said hitch comprises an automatic latch.

16. A hitching device as in claim 15 wherein said automatic latch is adapted for automatically coupling with a hitch pin of a trailer type device; said automatic latch comprising:
   (a) a tongue mounted on said bottom frame member and having a slot formed therein;
   (b) a latch plate pivotally mounted on a post secured to said tongue and pivotal between an open alignment and a closed alignment relative to said tongue; said latch plate having a hook formed on and extending partially across an end of said latch plate and defining a curved slot in said latch plate extending generally transverse to said tongue slot; said hook and said latch plate slot positioned adjacent said tongue slot when said latch plate is positioned in said open alignment; said latch plate having a curved outwardly facing wall which is curved inward and eccentrically relative to said post, a first portion of which defines an inner edge of said curved latch plate slot and a second portion of which extends across said tongue slot when said latch plate is in said open alignment such that advancement of a hitch pin into said tongue slot and against said curved outwardly facing wall causes said latch plate to pivot about said post to said closed alignment such that said hook extends across said tongue slot and said hitch pin is positioned within said latch plate slot; and
   (c) a spring loaded locking mechanism mounted on said tow bar, engaging said latch plate and locking said latch plate in said closed alignment as it is advanced thereto.

17. A hitching device for use in association with a three-point hitch, the three point hitch including a center link positioned above and between a pair of draft links, said hitching device comprising:
   (a) a frame having a bottom frame member connected to a pair of side frame members, said bottom frame member including a hitch; and
   (b) a pair of support pins each secured relative to a respective one of said side frame members and adapted for engagement by a coupling member associated with a distal end of a respective draft link; a substantial portion of each of said side frame members extending between said respective pins and said bottom frame member extend completely forward of said respective pins such that when said pins are engaged b0y said coupling members associated with said draft links, said bottom frame member is entirely disposed at a location that is below the draft links and that is forward of said pins.

18. A hitching device for use in association with a three-point hitch, the three point hitch including a center link positioned above and between a pair of draft links, said hitching device comprising:
   (a) a frame having top and bottom frame members connected by a pair of side frame members, said bottom frame member including a hitch; and
   (b) a pair of support pins each secured to a respective one of said side frame members medially between said top and bottom frame members and adapted for engagement by a coupling member associated with a distal end of a respective draft link; a substantial portion of a lower section of each of said side frame members extend completely forward of said respective pins such that when said pins are engaged by said coupling members associated with said draft links, said bottom frame member is entirely disposed at a location that is below the draft links and that is forward of said pins.

* * * * *